US011880617B2

(12) United States Patent
Inoue

(10) Patent No.: US 11,880,617 B2
(45) Date of Patent: Jan. 23, 2024

(54) DETECTING A DEFECT IN A PRINTING SHEET AND EJECTING SAID PRINTING SHEET

(71) Applicant: Takahiro Inoue, Kanagawa (JP)

(72) Inventor: Takahiro Inoue, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 17/818,435

(22) Filed: Aug. 9, 2022

(65) Prior Publication Data
US 2023/0084353 A1 Mar. 16, 2023

(30) Foreign Application Priority Data
Sep. 13, 2021 (JP) .................... 2021-148723

(51) Int. Cl.
*G06F 3/12* (2006.01)
*H04N 1/00* (2006.01)

(52) U.S. Cl.
CPC ............ *G06F 3/1234* (2013.01); *G06F 3/121* (2013.01); *H04N 1/00029* (2013.01); *H04N 1/00631* (2013.01)

(58) Field of Classification Search
None
See application file for complete search history.

(56) References Cited

U.S. PATENT DOCUMENTS

| | | | | |
|---|---|---|---|---|
| 5,954,436 A | * | 9/1999 | Kageyama | B41J 3/60 358/1.12 |
| 10,051,149 B1 | * | 8/2018 | Yoshida | H04N 1/00244 |
| 2005/0174379 A1 | | 8/2005 | Nakazawa et al. | |
| 2011/0076069 A1 | | 3/2011 | Yagawara et al. | |
| 2012/0020689 A1 | | 1/2012 | Inoue et al. | |
| 2013/0289763 A1 | | 10/2013 | Inoue | |
| 2016/0105571 A1 | * | 4/2016 | Van Horssen | H04N 1/0032 358/1.15 |
| 2016/0121602 A1 | | 5/2016 | Nagasu et al. | |
| 2017/0003633 A1 | * | 1/2017 | Hase | G03G 15/2064 |
| 2017/0031636 A1 | | 2/2017 | Kital | |
| 2017/0090361 A1 | | 3/2017 | Kuwana et al. | |

(Continued)

FOREIGN PATENT DOCUMENTS

| | | |
|---|---|---|
| JP | 2013-111871 | 6/2013 |
| JP | 2016-159434 | 9/2016 |
| JP | 2017-034298 | 2/2017 |

*Primary Examiner* — Eric A. Rust
(74) *Attorney, Agent, or Firm* — IPUSA, PLLC

(57) ABSTRACT

An image forming apparatus includes a memory and processing circuitry. The memory stores an identifier for identifying a defective page and an identifier for identifying a print job that includes the defective page. The processing circuitry determines whether print job data is data of a print job to be reprinted and determines whether a page included in a conveyance medium conveyed is a defective page, based on the identifier for identifying the defective page. The processing circuitry also performs control to eject a first conveyance medium including a page not determined to be defective to a first ejection destination, eject a second conveyance medium including a defective page to a second ejection destination, print an image of the defective page on a third conveyance medium, and eject the third conveyance medium on which the image is printed to the first ejection destination.

9 Claims, 6 Drawing Sheets

(56) References Cited

U.S. PATENT DOCUMENTS

| | | | |
|---|---|---|---|
| 2017/0106647 A1 | 4/2017 | Inoue | |
| 2019/0004745 A1* | 1/2019 | Itai | G06F 3/1205 |
| 2019/0155555 A1* | 5/2019 | Ito | H04N 1/00037 |
| 2019/0191047 A1* | 6/2019 | Ueda | H04N 1/00633 |
| 2019/0238685 A1* | 8/2019 | Tsukamoto | H04N 1/00074 |
| 2020/0334506 A1* | 10/2020 | Zamir | G06K 15/027 |

* cited by examiner

DETECTING A DEFECT IN A PRINTING SHEET AND EJECTING SAID PRINTING SHEET

CROSS-REFERENCE TO RELATED APPLICATIONS

This patent application is based on and claims priority pursuant to 35 U.S.C. § 119(a) to Japanese Patent Application No. 2021-148723, filed on Sep. 13, 2021, in the Japan Patent Office, the entire disclosure of which is hereby incorporated by reference herein.

BACKGROUND

Technical Field

Embodiments of the present disclosure relate to an image forming apparatus, a reprinting method, and a storage medium.

Related Art

A technology is known to detect an image defect in a printed image from a result of reading the image printed by an image forming apparatus. Further, a technology is known to reprint an image in which an image defect has been detected.

For example, a technology has been proposed to eject a sheet whose printing condition is determined to be abnormal by an inspection device and an insertion sheet in place of the sheet whose printing condition is determined to be abnormal for the purpose of allowing a user to recognize a sheet to be reprinted.

SUMMARY

In an embodiment of the present disclosure, an image forming apparatus includes a memory and processing circuitry. The memory stores an identifier for identifying a defective page for each print job and an identifier for identifying a print job that includes the defective page in association with each other. The processing circuitry determines whether print job data is data of a print job to be reprinted and determines whether a page included in a conveyance medium conveyed is a defective page, based on the identifier for identifying the defective page in response to determination that the print job data is data of a print job to be reprinted. The processing circuitry also performs control to eject a first conveyance medium including a page not determined to be defective to a first ejection destination, eject a second conveyance medium including a defective page to a second ejection destination, print an image of the defective page on a third conveyance medium, and eject the third conveyance medium on which the image is printed to the first ejection destination.

In another embodiment of the present disclosure, a method to be executed by a computer includes storing, determining, and controlling. The storing stores an identifier for identifying a defective page for each print job and an identifier for identifying a print job that includes the defective page in association with each other. The determining determines whether print job data is data of a print job to be reprinted and determines whether a page included in a conveyance medium conveyed is a defective page, based on the identifier for identifying the defective page in response to determination that the print job data is data of a print job to be reprinted. The controlling controls to eject a first conveyance medium including a page not determined to be defective to a first ejection destination, eject a second conveyance medium including a defective page to a second ejection destination, print an image of the defective page on a third conveyance medium, and eject the third conveyance medium on which the image is printed to the first ejection destination.

In still another embodiment of the present disclosure, there is provided a non-transitory computer-readable storage medium having instructions stored thereon, which when executed by one or more processors, cause the one or more processors to execute storing, determining, and controlling. The storing stores an identifier for identifying a defective page for each print job and an identifier for identifying a print job that including the defective page in association with each other. The determining determines whether print job data is data of a print job to be reprinted. The controlling controls to eject a first conveyance medium including a page not determined to be defective to a first ejection destination, eject a second conveyance medium including the defective page to a second ejection destination, print an image of the defective page on a third conveyance medium, and eject the third conveyance medium on which the image is printed to the first ejection destination.

BRIEF DESCRIPTION I/F THE DRAWINGS

A more complete appreciation of the disclosure and many of the attendant advantages and features thereof can be readily obtained and understood from the following detailed description with reference to the accompanying drawings, wherein.

Figure 1:
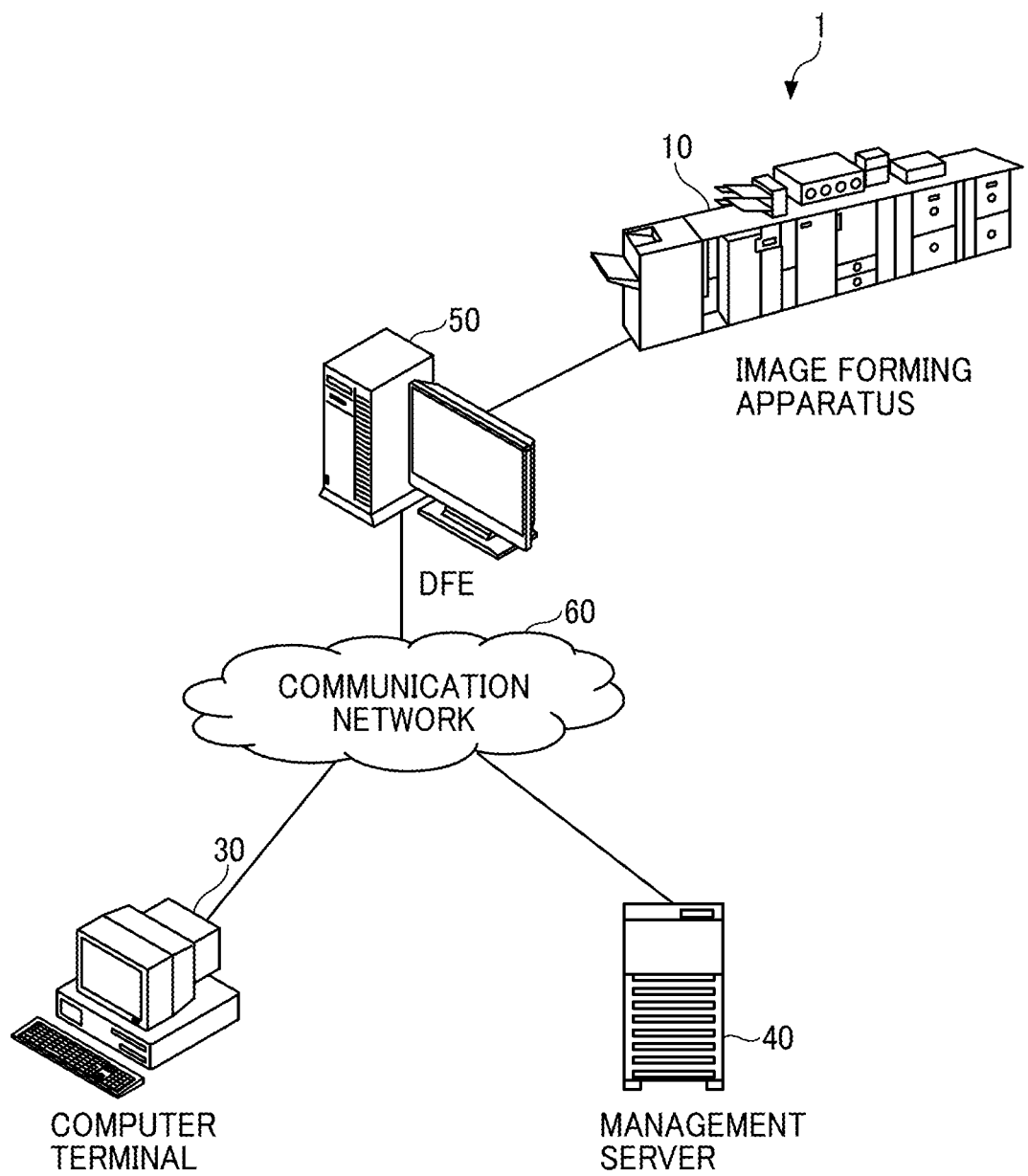
FIG. 1 is a diagram illustrating a system configuration of an image forming system according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

First Embodiment

An image forming system according to a first embodiment of the present disclosure is described with reference to the drawings in the following description.

FIG. 1 is a diagram illustrating a system configuration of an image forming system 1, according to the present embodiment.

The image forming system 1 includes an image forming apparatus 10, a computer terminal 30, a management server 40, and a digital front end (DFE) 50.

The image forming apparatus 10 is an apparatus that forms an image, such as a color production printer, a laser printer, or an inkjet printer. The image forming apparatus 10 receives image data from the DFE 50 and prints an image on a sheet based on the received image data. Note that the sheet is an example of a conveyance medium on which an image is to be formed.

The computer terminal 30 is a terminal operated by a user and instructs printing of an image. More specifically, the computer terminal 30 transmits print job data including image data to the DFE 50 or the management server 40. The computer terminal 30 receives an operation by a user and transmits data indicating a threshold value in color stabilization processing to the DFE 50. Further, the computer terminal 30 receives display control from the DFE 50 and displays a screen indicating an execution status of the color stabilization processing.

When the management server 40 receives print job data from the computer terminal 30, the management server 40 adds print job data in a storage unit that stores the print job data as a queue to be printed. Then, the management server 40 extracts print job data from the queue in the order added to the queue or in accordance with a priority set as needed and transmits the print job data to the DFE 50.

The DFE 50 is a device that controls the image forming apparatus 10 and is, for example, a digital front end. The DFE 50 is connected to the image forming apparatus 10, the computer terminal 30, and the management server 40 to communicate with each other.

When the DFE 50 receives print job data together with a signal instructing printing of an image from the computer terminal 30 or the management server 40 via a communication network 60, the DFE 50 converts the print job data into image data in a format that can be processed by the image forming apparatus 10 by a built-in raster image processor (RIP) engine and transmits the print job data including the converted image data to the image forming apparatus 10.

Figure 2:
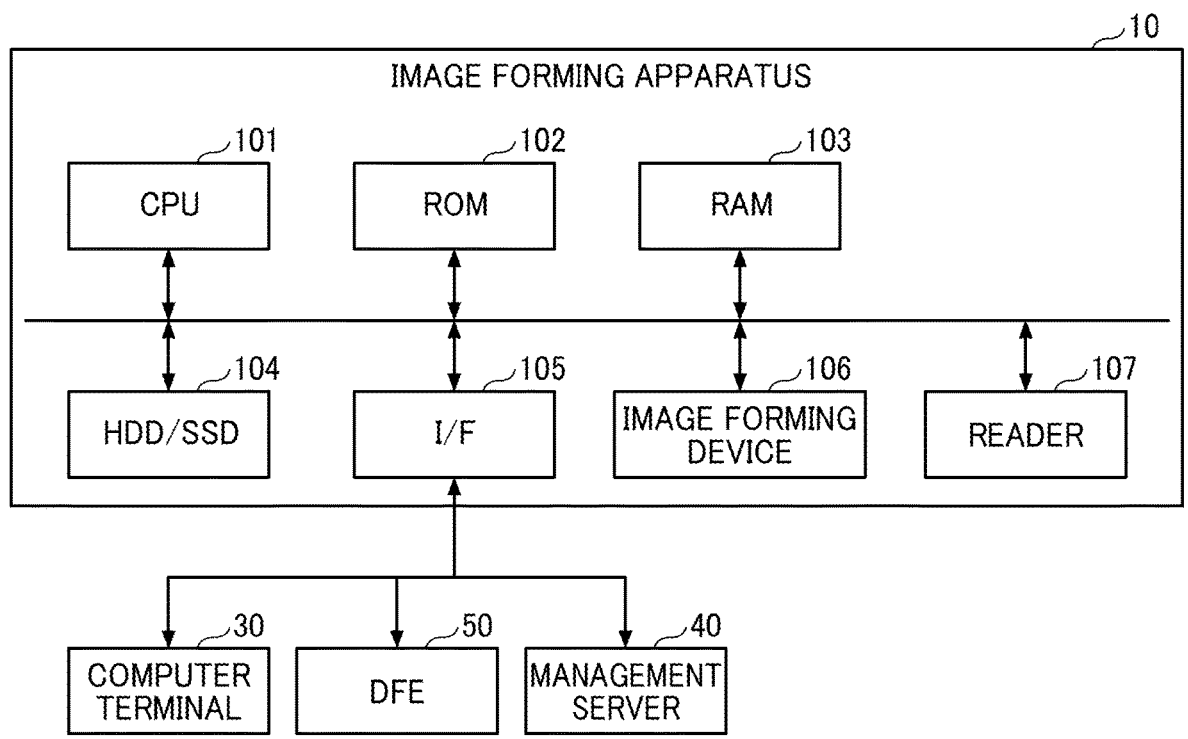
FIG. 2 is a block diagram illustrating a hardware configuration of an image forming apparatus according to an embodiment of the present disclosure.

FIG. 2 is a block diagram illustrating a hardware configuration of the image forming apparatus 10 according to the present embodiment.

The image forming apparatus 10 includes a built-in computer and is an apparatus that includes a central processing unit (CPU) 101, a read only memory (ROM) 102, a random access memory (RAM) 103, a hard disk drive and solid state drive (HDD/SSD) 104, an interface (I/F) 105, an image forming device 106, and a reader 107, which are connected to each other via a bus.

The CPU 101 reads a program stored in the ROM 102 or the HDD/SSD 104 and stores the program in the RAM 103.

The CPU 101 executes various processing described later in accordance with the program stored in the RAM 103.

The ROM 102 is a non-volatile auxiliary storage device. The ROM 102 stores a program that defines basic operations of the image forming apparatus 10 such as a basic input/output system (BIOS).

The RAM 103 is a volatile main storage device. The RAM 103 is used as a work area of the CPU 101.

The HDD/SSD 104 is a nonvolatile auxiliary storage device having a large capacity. The HDD/SSD 104 stores, for example, received image data, programs for executing various processing to be described later, and setting data.

The I/F 105 includes, for example, a local area network (LAN) card, and serves as a repeater when the image forming apparatus 10 communicates with the computer terminal 30, the management server 40, or the DFE 50.

The image forming device 106 receives an instruction from the CPU 101 and forms an image on a sheet.

The reader 107 reads an image formed on the sheet by the image forming device 106 and stores the read image data, for example, in the RAM 103.

Figure 3:
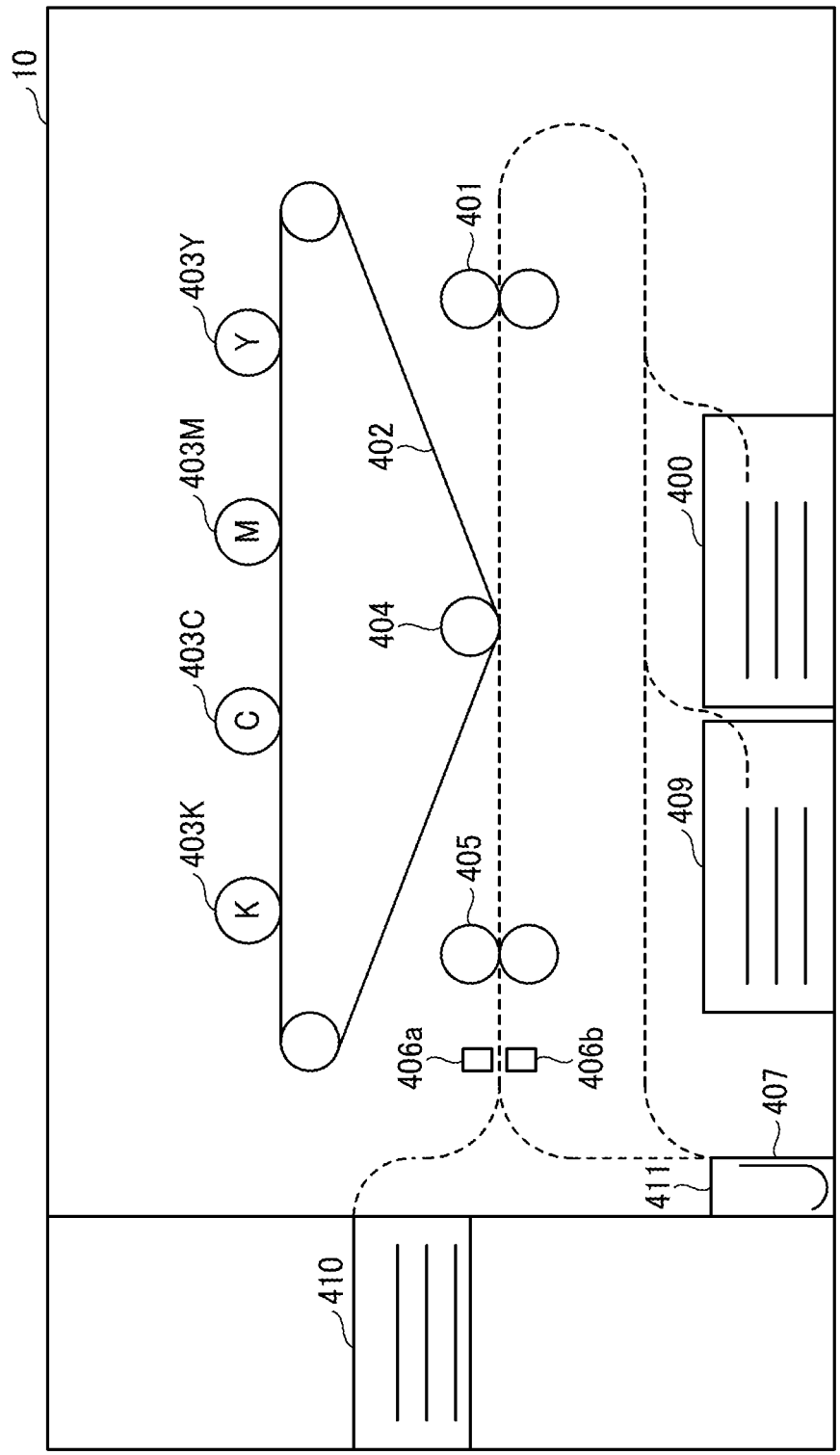
FIG. 3 is a diagram illustrating an internal structure of an image forming apparatus according to an embodiment of the present disclosure.

FIG. 3 is a diagram illustrating an internal structure of the image forming apparatus 10 according to the present embodiment.

In the image forming apparatus 10, photoconductor drums 403Y, 403M, 403C, and 403K of respective colors of yellow, magenta, cyan, and black (hereinafter referred to as Y, M, C, and K, respectively) are arranged along an intermediate transfer belt 402 which is an endless conveyor. Images of respective Y, M, C, and K colors developed with toner on surfaces of the photoconductor drums 403Y, 403M, 403C, and 403K of respective colors are superposed by the intermediate transfer belt 402 to form a full-color image.

The formed full-color image is fed from a first sheet tray 400 or a second sheet tray 409 and is transferred onto a surface of a sheet conveyed by a conveyance roller 401 by a transfer roller 404. Then, the sheet is further conveyed, toner is fixed onto the sheet by a fixing roller pair 405, and the sheet is ejected to an ejection tray 410.

The first sheet tray 400 is a sheet tray designated for a print job and is used at the time of printing other than reprinting. The second sheet tray 409 is a sheet tray for reprinting and is used at the time of reprinting.

When duplex printing is performed, an image is formed on a front side of a sheet, and the sheet is conveyed to a reverse path 407 in a conveyance path. Then, after the front and back sides of the sheet are reversed, the sheet is conveyed again to a position of the transfer roller 404.

Further, the image forming apparatus 10 includes in-line sensors 406a and 406b. The in-line sensors 406a and 406b read images fixed on both sides of the sheet after toner has been fixed onto both sides of the sheet by the fixing roller pair 405 and generate read image data indicating the read image. Note that the number of in-line sensors is not limited to two and may be one or three or greater as long as one side or both sides of a sheet to be conveyed can be read.

A waste tray 411 serves as an area in which a sheet on which an image defect has been detected is ejected, at the time of reprinting when the image defect has been detected on the sheet by image inspection. When reprinting is performed, the image forming apparatus 10 ejects a sheet on which an image defect has been detected to the waste tray 411 and ejects a sheet on which no image defect has been detected to the ejection tray 410. In other words, the ejection tray 410 is a first ejection destination to which a sheet on which image defect has not been detected in reprinting is ejected, and the waste tray 411 is a second ejection destination to which a sheet on which image defect has been detected in reprinting is ejected.

Figure 4:
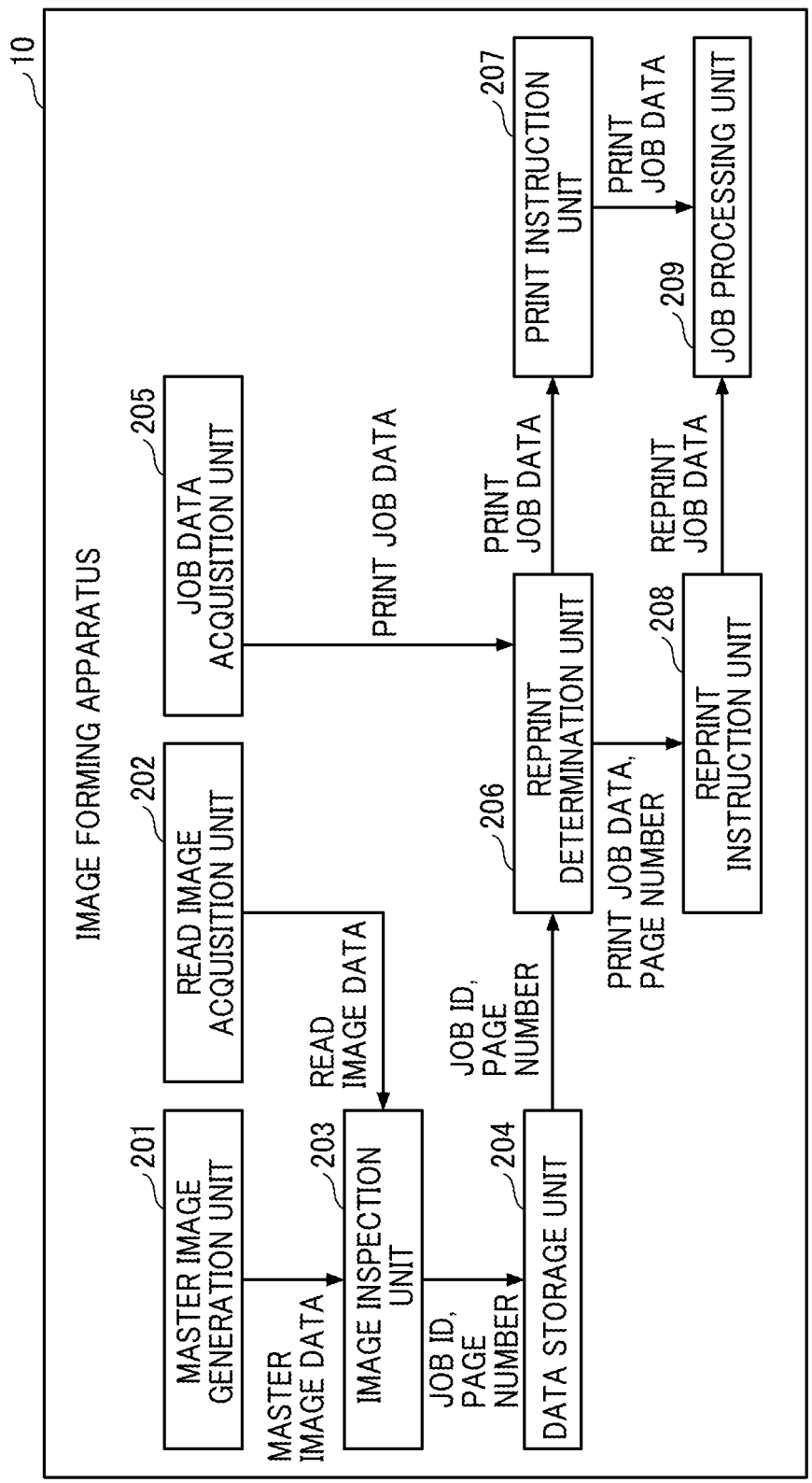
FIG. 4 is a block diagram illustrating a functional configuration of the image forming apparatus of FIG. 3.

FIG. 4 is a block diagram illustrating a functional configuration of the image forming apparatus 10 according to the present embodiment.

The image forming apparatus 10 includes a master image generation unit 201, a read image acquisition unit 202, an image inspection unit 203, a data storage unit 204, a job data acquisition unit 205, a reprint determination unit 206, a print instruction unit 207, a reprint instruction unit 208, and a job processing unit 209.

The master image generation unit 201 generates master image data based on RIP image data indicating an image to be printed by the image forming device 106. More specifically, the master image generation unit 201 converts the RIP image data in cyan, magenta, yellow, and black (CMYK) format into the master image data in red, green, and blue (RGB) format.

The master image data serves as a reference with which the read image data is compared and functions as correct data when an image is correctly printed. The master image generation unit 201 may read a sheet on which a reference image is printed by a scanner, in-line sensors or a scanner of an external device to generate master image data. The image forming device 106 may print an image based on the master image data.

The read image acquisition unit 202 obtains read image data read by the reader 107.

The image inspection unit 203 compares the master image data with the read image data to determine whether there is an image defect in a printed material. More specifically, the image inspection unit 203 determines the presence or absence of an image defect in each page of the printed material and stores a page number that serves as an identifier for identifying a defective page, i.e., a page having a defective image, in the data storage unit 204 in association with a job ID functioning as an identifier for identifying a print job that includes the identified page.

The data storage unit 204 stores data indicating the presence or absence of an image defect in the printed material, determined by the image inspection unit 203. More specifically, the data storage unit 204 stores a page number of a defective page and the job ID in association with each other. One or more page numbers may be associated with one job ID.

The reprint determination unit 206 determines whether the print job data is data of a job to be reprinted. More specifically, the reprint determination unit 206 determines whether the job ID of the print job data acquired by the job data acquisition unit 205 is stored in the data storage unit 204.

When the reprint determination unit 206 determines that the job ID is stored in the data storage unit 204, the reprint determination unit 206 transfers the page number associated with the job ID to the reprint instruction unit 208 together with the print job data. Alternatively, when the reprint determination unit 206 determines that the job ID is not stored in the data storage unit 204, the reprint determination unit 206 transfers the print job data to the print instruction unit 207.

Note that when a print job, even though having the same print job data, cannot be determined with a job ID, the reprint determination unit 206 may determine the print job to be reprinted based on data other than the job ID. For example, the reprint determination unit 206 may store image data included in print job data in the data storage unit 204 and compare the image data with image data included in newly acquired print job data to determine whether the print job is a print job to be reprinted.

The print instruction unit 207 transfers the print job data transferred from the reprint determination unit 206 to the job processing unit 209 and instructs the job processing unit 209 to perform normal printing that is not reprinting.

The reprint instruction unit 208 generates job data for reprinting (reprint job data) based on the transferred page number, transfers the job data to the job processing unit 209, and instructs the job processing unit 209 to perform reprinting. The reprint job data includes data indicating the page number of the defective page. Note that the number of pages having an image defect may be one or more.

The job processing unit 209 processes the transferred print job data or the reprint job data. In other words, when the print job data is transferred to the job processing unit 209, the job processing unit 209 executes print processing. When the reprint job data is transferred to the job processing unit 209, the job processing unit 209 executes reprint processing.

Figure 5:
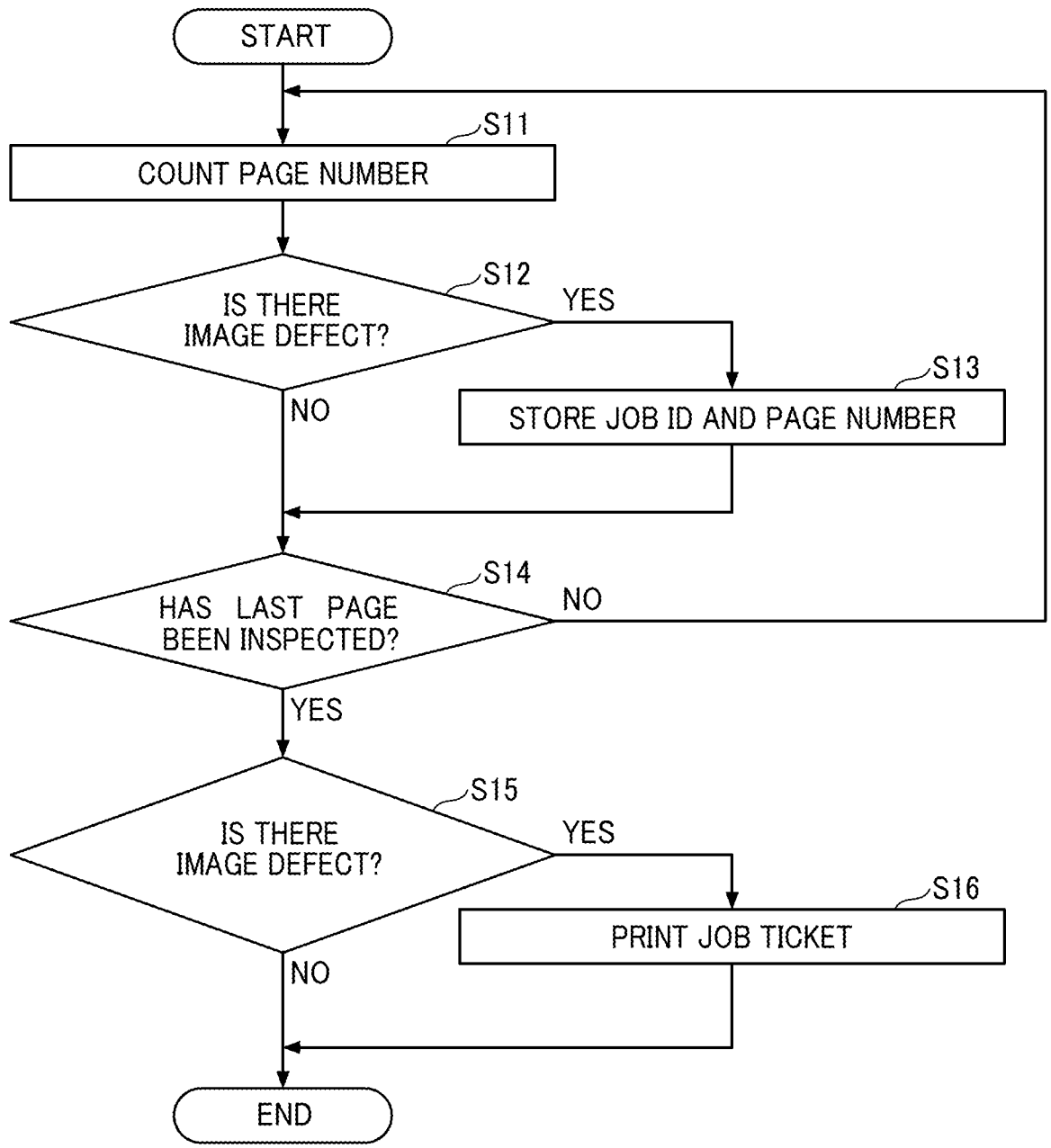
FIG. 5 is a flowchart illustrating a procedure of printing processing according to an embodiment of the present disclosure.

FIG. 5 is a flowchart illustrating a procedure of printing processing according to the present embodiment.

When the job processing unit 209 starts printing an image, the image inspection unit 203 counts page numbers of pages that are being inspected (step S11). The image inspection unit 203 compares the master image data with the read image data and determines whether there is an image defect in the printed material (step S12).

When the image inspection unit 203 determines that the printed material has an image defect (YES in step S12), the data storage unit 204 stores the job ID and the counted page numbers in association with each other (step S13).

When the image inspection unit 203 determines that there is no image defect in the printed material (NO in step S12), the image inspection unit 203 determines whether a last page of the printed material has been inspected (step S14). When the image inspection unit 203 determines that the last page of the printed material has not been inspected yet (NO in step S14), the printing processing returns to step S11 and proceeds to processing of a next page.

When the image inspection unit 203 determines that the last page of the printed material has been inspected (YES in step S14), the image inspection unit 203 determines whether there is any image defect in the inspected print job (step S15). When the image inspection unit 203 determines that there is any image defect in the inspected print job (YES in step S15), the job processing unit 209 prints a job ticket (step S16).

The job ticket is a sheet on which data necessary for reprinting is printed, such as data indicating a sheet tray, e.g., the second sheet tray 409 to which the user sets a printed sheet(s) at the time of reprinting or data indicating a direction in which a printed sheet(s) is to be set.

The job processing unit 209 may select a sheet tray having settings suitable for a reprint job, such as sheet size, sheet orientation (vertical or horizontal), number of sheets storable in the sheet tray, based on settings, such as sheet size, printing orientation (vertical or horizontal), number of pages to be printed, the setting of the sheet tray, of a print job including a page determined to have an image defect. Then, the job processing unit 209 may print the data indicating the selected sheet tray on the job ticket.

When the job processing unit 209 determines that there is no defective page (NO in step S15), the job processing unit 209 skips the processing of step S16 and ends the printing process.

The user can refer to the printed job ticket to prepare for reprinting. Specifically, in the case of a print job in which the job ticket is not printed, the user can terminate the printing operation.

Alternatively, in a print job in which the job ticket is printed, the user can set a bundle of printed materials ejected to the ejection tray 410 on the second sheet tray 409 based on the data printed on the job ticket.

When the user operates the computer terminal 30 to instruct printing, the reprint determination unit 206 determines that the job is a reprint job based on the print job data acquired by the job data acquisition unit 205. Then, the job processing unit 209 executes the reprint processing based on reprint job data transferred from the reprint instruction unit 208.

Figure 6:
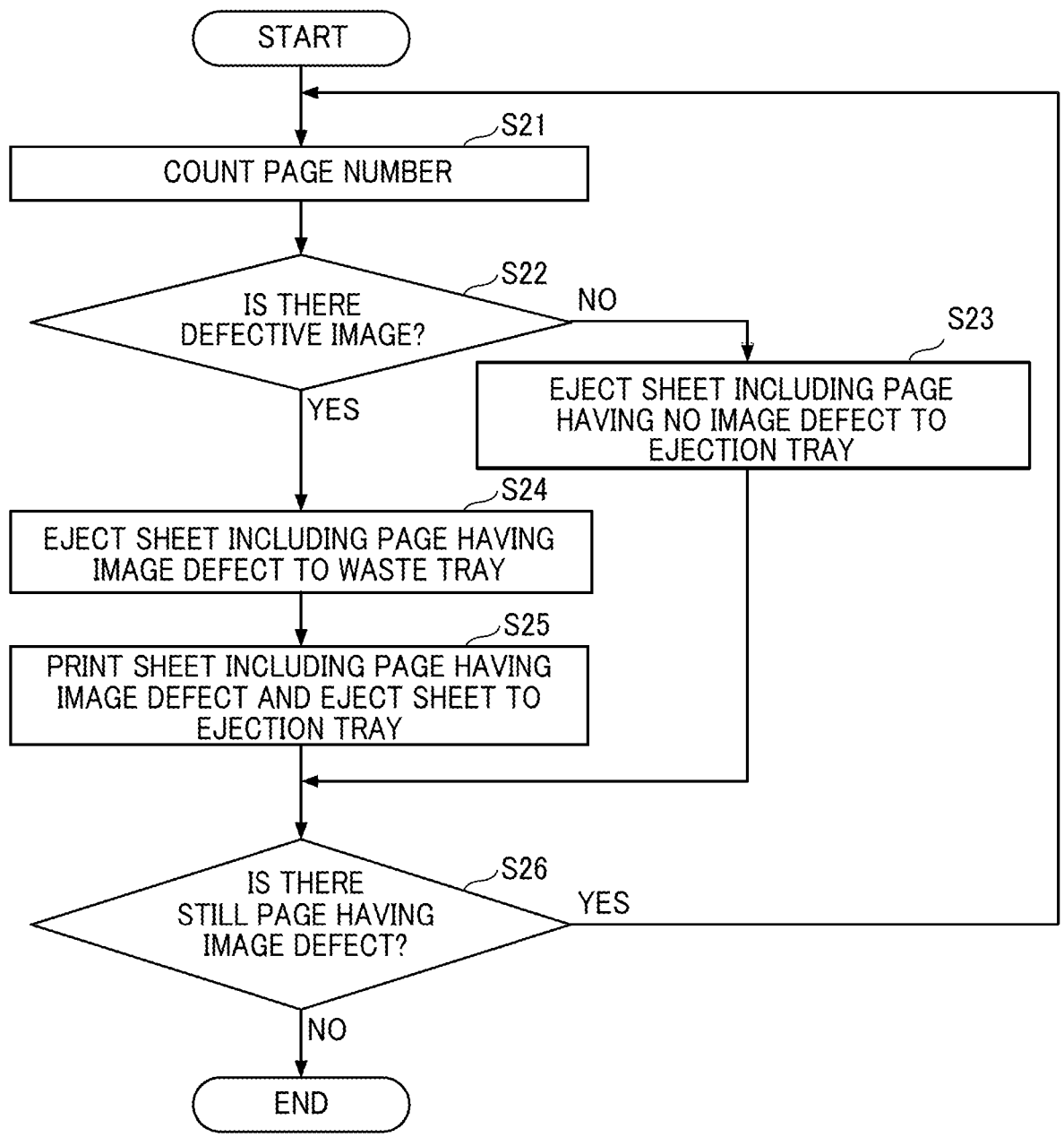
FIG. 6 is a flowchart illustrating a procedure of reprint processing according to an embodiment of the present disclosure.

FIG. 6 is a flowchart illustrating a procedure of reprint processing according to the present embodiment.

The job processing unit 209 counts page numbers of reprint job data being processed (step S21). Next, the job processing unit 209 determines whether a page being processed is a defective page (step S22).

When the job processing unit 209 determines that the page being processed does not have an image defect (NO in step S22), the job processing unit 209 ejects the sheet as a first conveyance medium containing the page fed from the second sheet tray 409 to the ejection tray 410 (step S23). At this time, the job processing unit 209 does not execute printing. Accordingly, the job processing unit 209 may control such that at least one of the transfer roller 404 and the fixing roller pair 405 is separated from the sheet to convey the sheet.

When the job processing unit 209 determines that the page being processed has an image defect (YES in step S22), the job processing unit 209 controls the image forming device 106 such that the sheet as a second conveyance medium including the defective page fed from the second sheet tray 409 is ejected to the waste tray (step S24). Then, the job processing unit 209 controls the image forming device 106 such that the image forming device 106 prints the image of the page determined to be defective on a sheet as a third conveyance medium fed from the first sheet tray 400 and eject the sheet to the ejection tray 410 (step S25).

The job processing unit 209 determines whether there is still a defective page in the reprint job being processed (step S26). When the job processing unit 209 determines that there is still a defective page in the reprint job being processed (YES in step S26), the process returns to step S21 to execute the reprint processing of the next page.

When the job processing unit 209 determines that there is no more defective page in the reprint job being processed (NO in step S26), the job processing unit 209 ends the reprint processing. Thus, the image forming apparatus 10 terminates the reprint processing when the reprinting of the last defective page is completed. Accordingly, the time required for the reprint processing is reduced. For example, when only a first page out of one hundred pages of reprint job data is a defective page, the image forming apparatus 10 can skip the sheet feeding operation and sheet ejection operation for the remaining ninety-nine pages and terminate the reprint processing.

Note that in determination in step S26, the image forming apparatus 10 may repeat the processing from step S21 to step S25 until the processing of all pages included in the reprint job data is completed. Accordingly, the image forming apparatus 10 outputs sheets of all the pages including pages that have not been determined to have an image defect and pages that have been reprinted collectively onto the ejection tray 410. Accordingly, the workload of the user can be further reduced.

In the image forming apparatus 10 according to the present embodiment, at the time of reprinting, a sheet on which an image defect has been detected is ejected to the waste tray 411, and a sheet on which no image defect has been detected is ejected to the ejection tray 410. Such a configuration as described above can obviate an operation to remove a sheet including a defective page and insert a replacement sheet after reprinting. Accordingly, the efficiency of reprinting sheets including defective pages can be enhanced.

The image forming apparatus 10 selects an ejection destination for each sheet in duplex printing. Accordingly, when either the front side or the back side of a sheet includes an image defect, both the front side and the back side of the sheet are reprinted.

An example in which the image forming apparatus 10 determines whether a print job is a normal print job or a reprint job to execute processing has been described above. However, determination of whether the print job or the reprint job is to be performed may be designated by a user. In such a case, the computer terminal 30 transmits data indicating whether a print job or a reprint job is to be performed to the image forming apparatus 10 via the DFE 50. The reprint determination unit 206 determines whether reprinting is to be performed based on data indicating whether a print job or a reprint job is to be performed.

The image forming apparatus 10 may print a job ticket on a sheet different from a sheet on which the image of a print job is printed. For example, the image forming apparatus 10 may print an image of a print job on a sheet supplied from the first sheet tray 400 and print a job ticket on a sheet supplied from the second sheet tray 409. Such a configuration as described above can reduce the cost of a sheet of paper in printing a job ticket that does not need a relatively high print quality as compared with the image of the print job.

If a sheet for reprinting is set from the ejection tray 410 to the second sheet tray 409 in the orientation as the sheet has been ejected to the ejection tray 410, the side of the sheet to be printed may be set in reverse to the side having been printed in the first printing. For this reason, the job processing unit 209 may use the reverse path 407 that is used for duplex printing even in the case of simplex printing and control the conveyance of the sheet such that the side of the sheet to be printed is reversed, to match the orientation of the sheet ejection to the ejection tray 410. Note that even in the case of duplex printing, the job processing unit 209 may perform control the conveyance of a sheet at the time of reprinting such that printing on a first side of a sheet is performed after reversing a side of the sheet to be printed using the reverse path 407, and subsequently, printing on a second side of the sheet is performed after reversing again a side of the sheet to be printed using the reverse path 407.

Further, when reprinting is performed, the order of pages to be printed on sheets may be reversed if the sheets are set from the ejection tray 410 to the second sheet tray 409 in the orientation as the sheets have been ejected to the ejection tray 410. For this reason, the job processing unit 209 may control to print the sheets in the reverse order from the last page. In addition, the image forming apparatus 10 may have a configuration of changing how sheets of paper are set in the second sheet tray 409 at the time of reprinting, as appropriate.

In some embodiments of the present disclosure, the image forming apparatus 10 may serve as a data processing system that includes multiple computing devices, such as server clusters. The multiple computing devices may communicate with each other via any type of communication link, including such as a network and a shared memory, and may perform the processing disclosed in the present disclosure.

Each function according to the embodiments described above can be implemented by one processing circuit or multiple processing circuits. The term processing circuit as used in the embodiments of the present disclosure includes a processor programmed by software to execute each function, such as a processor implemented by an electronic circuit, and devices such as an application specific integrated circuit (ASIC), a digital signal processor (DSP), a field programmable gate array (FPGA) and a conventional circuit module designed to execute each function described above.

Aspects of the present disclosure are described based on the above-described embodiments. However, the present disclosure are not limited to the elements of the above-described embodiments. The elements of the above-described embodiments can be modified without departing from the gist of the present disclosure, and can be appropriately determined according to the application form.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. An image forming system comprising:
a computer terminal configured to:
receive a print instruction for a print job from a user; and
transmit print job data to a management server;
the management server, wherein the management server is configured to:
receive the print job data from the user computer terminal;
store the print job data as a queue to be printed;
extract the print job data from the queue in accordance with a priority; and
transmit the extracted print job data to a digital front end (DFE);
the DFE, wherein the DFE is configured to:
receive the extracted print job data from the management server;
convert the extracted print job data into image data, wherein the image data comprises data of the cyan, magenta, yellow, and black (CMYK) format;
transmit the converted print job data to an image forming apparatus;
the image forming apparatus, wherein the image forming apparatus comprises:
a memory, wherein the memory is configured to:
receive the converted print job data from the DFE;
store an identifier for identifying a defective page for each print job and an identifier for identifying a print job that includes the defective page in association with each other; and
processing circuitry configured to:
generate a master image by converting the converted print job data from the CMYK format into red, green, and blue (RGB) format;
determine whether a page included in the print job is a defective page, based on the generated master image and the identifier for identifying the defective page;
determine, based on the determination of whether the page included in the print job is a defective page, whether the converted print job data is data of a print job to be reprinted; and
in response to determination that the converted print job data is data of a print job to be reprinted, perform control to eject a first conveyance medium including a page not determined to be defective to a first ejection destination, eject a second conveyance medium including a defective page to a second ejection destination, print an image of the defective page on a third conveyance medium, and eject the third conveyance medium on which the image is printed to the first ejection destination.

2. The image forming system according to claim 1, wherein the processing circuitry is configured to perform control to print a plurality of pages on conveyance media in a reverse order from a last page of the plurality of pages.

3. The image forming system according to claim 1, wherein the processing circuitry is configured to perform control to separate at least one of a transfer roller or a fixing roller from the first conveyance medium when the first conveyance medium is ejected to the first ejection destination.

4. The image forming system according to claim 1, wherein the processing circuitry is configured to:
determine whether a printed page included in a print job is defective; and
store, in the memory, an identifier for identifying the printed page determined to be defective and an identifier for identifying the print job in association with each other.

5. The image forming system according to claim 1, wherein the processing circuitry is configured to perform control to print on the first conveyance medium and the second conveyance medium including reprinting a page determined to be defective.

6. The image forming system according to claim 1, wherein the processing circuitry is configured to terminate reprinting processing in response to determination that there is no more defective page in a reprint job being processed.

7. The image forming system according to claim 1, wherein the processing circuitry is configured to perform control to reverse a side of a sheet to be printed in reprinting in a print job for single-sided printing.

8. A method to be executed by a computer, the method comprising:

receiving, at a user terminal computer, a print instruction for a print job from a user;
transmitting, from the user terminal computer, print job data to a management server;
receiving, at the management server, the print job data;
storing, at the management server, the print job data as a queue to be printed;
extracting, at the management server, the print job data from the queue in accordance with a priority;
transmitting, from the management server, the print job data to a digital front end (DFE);
receiving, at the DFE, the extracted print job data;
converting, by the DFE, the extracted print job data into image data, wherein the image data comprises data of the cyan, magenta, yellow, and black (CMYK) format;
transmitting, from the DFE, the converted print job data to an image forming apparatus,
receiving, at the image forming apparatus, the converted print job data,
storing, by the image forming apparatus, an identifier for identifying a defective page for each print job and an identifier for identifying a print job that includes the defective page in association with each other;
generating, by the image forming apparatus, a master image by converting the converted print job data from the CMYK format into red, green, and blue (RGB) format;
determining, by the image forming apparatus, whether a page included in the print job is a defective page, based on the generated master image and the identifier for identifying the defective page;
determine, by the image forming apparatus and based on the determination of whether the page included in the print job is a defective page, whether the converted print job data is data of a print job to be reprinted; and
in response to determination that the converted print job data is data of a print job to be reprinted, controlling, by the image forming apparatus, to eject a first conveyance medium including a page not determined to be defective to a first ejection destination, eject a second conveyance medium including a defective page to a second ejection destination, print an image of the defective page on a third conveyance medium, and eject the third conveyance medium on which the image is printed to the first ejection destination.

9. A non-transitory computer-readable storage medium having instructions stored thereon, which when executed by one or more processors, cause the one or more processors to execute:
receiving, at a user terminal computer, a print instruction from a user;
transmitting, from the user terminal computer, print job data to a management server;
receiving, at the management server, the print job data;
storing, at the management server, the print job data as a queue to be printed;
extracting, at the management server, the print job data from the queue in accordance with a priority;
transmitting, from the management server, the print job data to a digital front end (DFE);
receiving, at the DFE, the extracted print job data;
converting, by the DFE, the extracted print job data into image data, wherein the image data comprises data of the cyan, magenta, yellow, and black (CMYK) format;
transmitting, from the DFE, the converted print job data to an image forming apparatus;
receiving, at the image forming apparatus, the converted print job data;
storing, by the image forming apparatus, an identifier for identifying a defective page for each print job and an identifier for identifying a print job that includes the defective page in association with each other;
generating, by the image forming apparatus, a master image by converting the converted print job data from the CMYK format into red, green, and blue (RGB) format;
determining, by the image forming apparatus and based on the stored identifier for identifying a defective page, whether the converted print job data is data of a print job to be reprinted; and
in response to determining that the converted print job data is data of a print job to be reprinted, controlling, by the image forming apparatus, to eject a first conveyance medium including a page not determined to be defective to a first ejection destination, eject a second conveyance medium including the defective page to a second ejection destination, print an image of the defective page on a third conveyance medium, and eject the third conveyance medium on which the image is printed to the first ejection destination.

* * * * *